US011373252B1

(12) United States Patent
Moses

(10) Patent No.: US 11,373,252 B1
(45) Date of Patent: Jun. 28, 2022

(54) ANALYZING SOCIAL-NETWORKING METRICS OF ONLINE SOCIAL NETWORKS

(71) Applicant: Meta Platforms, Inc., Menlo Park, CA (US)

(72) Inventor: Nicolas Emilio Stier Moses, Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1207 days.

(21) Appl. No.: 14/965,680

(22) Filed: Dec. 10, 2015

(51) Int. Cl.
*G06Q 50/00* (2012.01)
*G06Q 10/04* (2012.01)
*G06Q 10/06* (2012.01)

(52) U.S. Cl.
CPC .............. *G06Q 50/01* (2013.01); *G06Q 10/04* (2013.01); *G06Q 10/06393* (2013.01)

(58) Field of Classification Search
CPC ...................................................... G06Q 50/01
See application file for complete search history.

(56) References Cited

U.S. PATENT DOCUMENTS

| 9,129,027 | B1 * | 9/2015 | Hamedi | ............... | G06F 16/9535 |
| 2007/0240119 | A1 * | 10/2007 | Ducheneaut | ........... | G06Q 10/10 717/124 |
| 2009/0234720 | A1 * | 9/2009 | George | ................. | G06Q 10/06 705/7.42 |
| 2011/0231028 | A1 * | 9/2011 | Ozog | ..................... | G06Q 10/06 700/291 |
| 2014/0079297 | A1 * | 3/2014 | Tadayon | .................. | G06K 9/00 382/118 |
| 2014/0324521 | A1 * | 10/2014 | Mun | ................ | G06Q 10/06393 705/7.28 |

* cited by examiner

*Primary Examiner* — Kurtis Gills
(74) *Attorney, Agent, or Firm* — Baker Botts L.L.P.

(57) ABSTRACT

In one embodiment, a method may include accessing, from a data store of a social network, historical data of a social-networking metric, and generating a historical-data plot for a pre-determined period of time based on the historical data. The method may include determining one or more events associated with fluctuations in the social-networking metric based on the historical-data plot, and determining a metric-effect of the events on the social-networking metric. Each event may be associated with a sub-period of time within the pre-determined period of time, and the metric-effect for each event may include a rate of change of the social-networking metric over the sub-period of time associated with the event and a magnitude of change of the social-networking metric. Then, the method includes generating a fluctuation model for the social-networking metric, the fluctuation model including the calculated metric-effects for each of the events over the pre-determined period of time.

21 Claims, 9 Drawing Sheets

ANALYZING SOCIAL-NETWORKING METRICS OF ONLINE SOCIAL NETWORKS

TECHNICAL FIELD

This disclosure generally relates to social graphs and analyzing the seasonal effects on certain social-networking metrics based on social-networking information of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may forecast a metric-of-interest (e.g., a social-networking metric corresponding to revenue, user activity, etc.) by taking into account the effects of seasonal patterns/trends (e.g., the seasonal variances that affect sales and operations). For example, the system can forecast a metric-of-interest by taking into account monthly trends, effects of holidays and other significant days, and day of week, end of month, and end of quarter effects. In addition, the system may analyze historical data and past seasonal variances to determine why a particular day or time period showed a particular variance. In particular embodiments, the social-networking system may access, from a data store of the online social network, historical data of a metric-of-interest, and generate a historical-data plot for a pre-determined period of time based on the accessed historical data. The social-networking system may determine one or more events associated with fluctuations in the metric-of-interest based on the historical-data plot, each event being associated with a sub-period of time within the pre-determined period of time. The social-networking system may then determine a metric-effect of the one or more events on the metric-of-interest, wherein the metric-effect for each event comprises a rate of change of the metric-of-interest over the sub-period of time associated with the event and a magnitude of change of the metric-of-interest. After that, the social-networking system may generate a fluctuation model for the metric-of-interest, wherein the fluctuation model comprises the calculated metric-effects for each of the one or more events over the pre-determined period of time.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
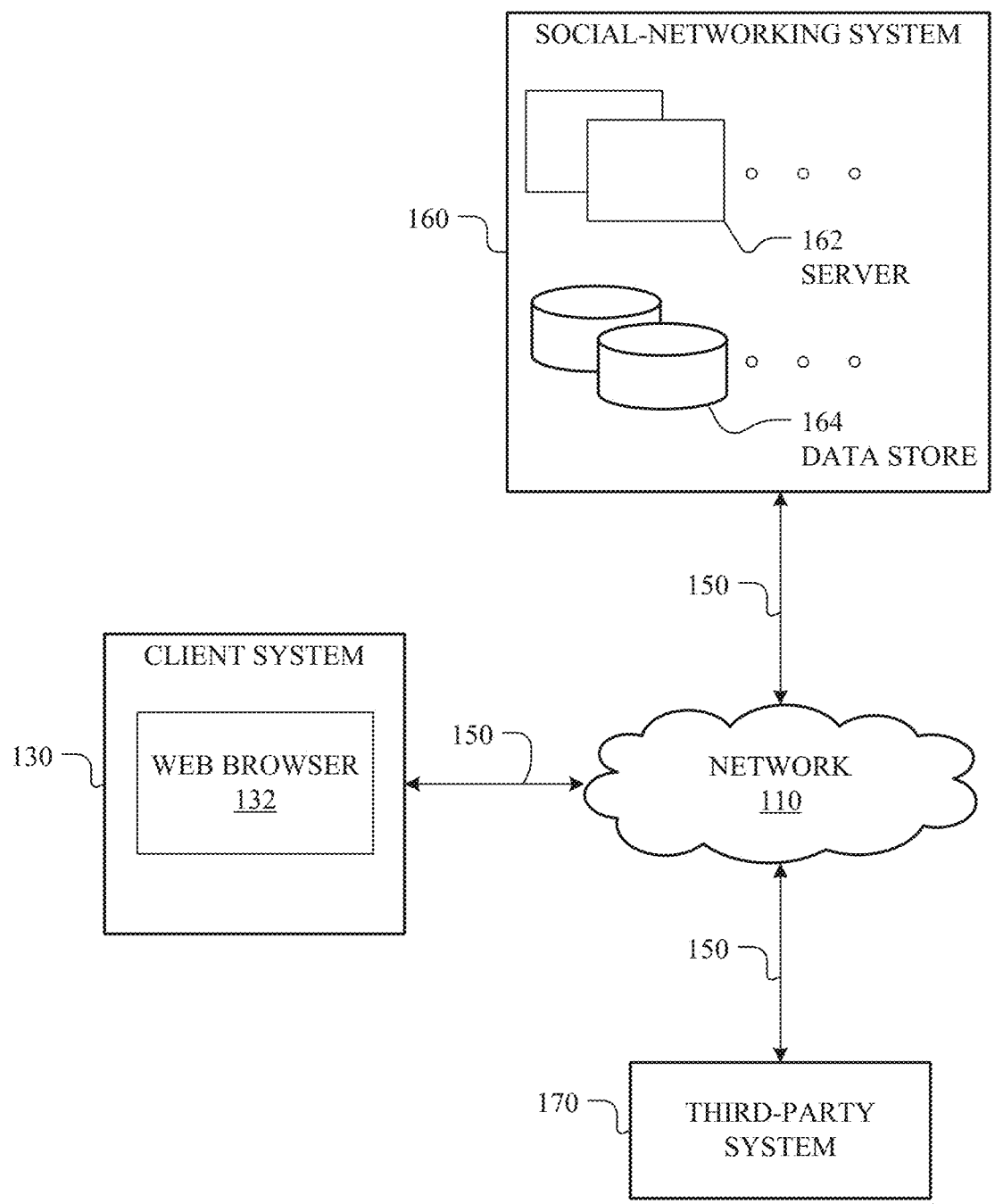
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
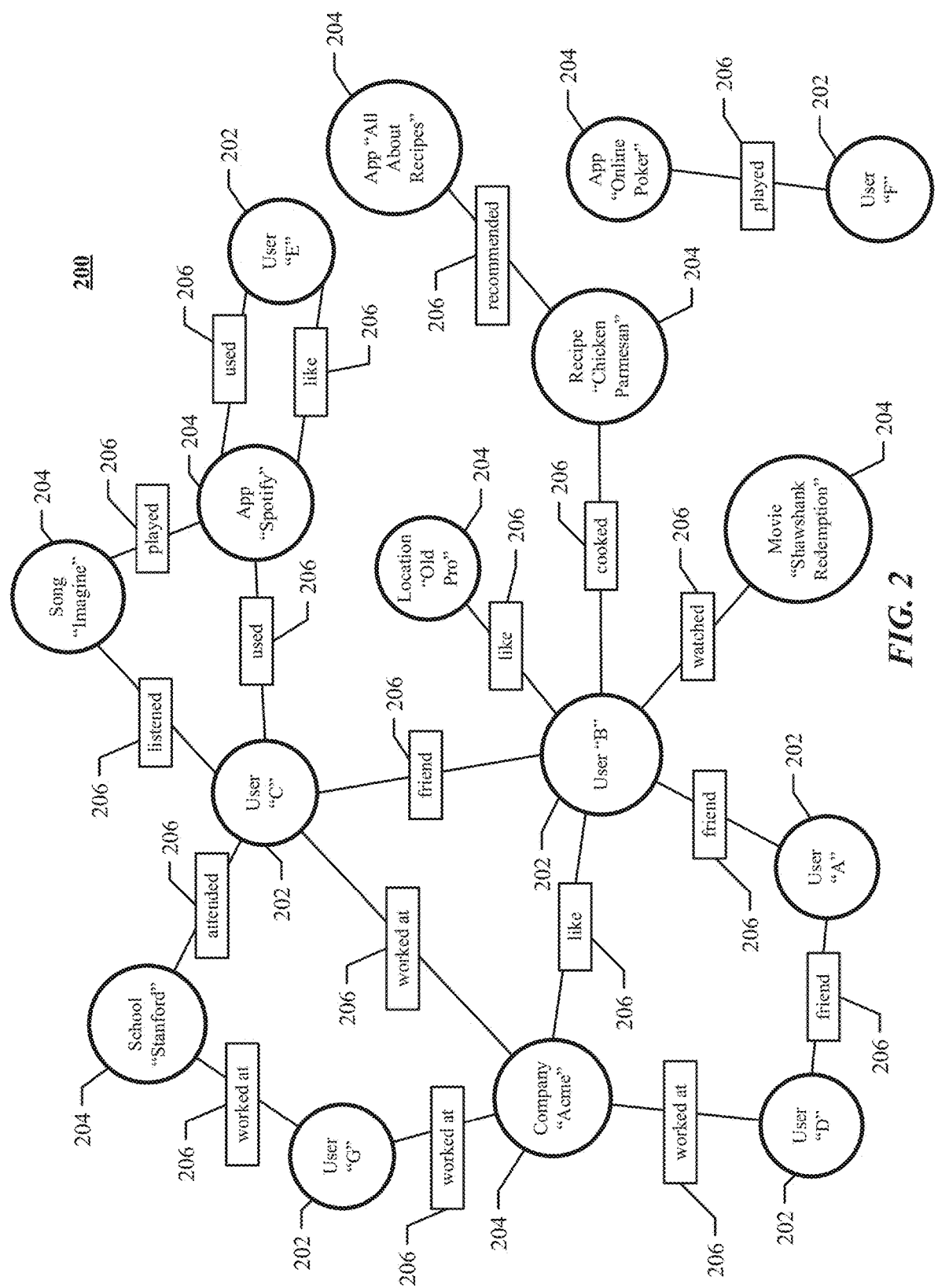
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PUP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Seasonality Modeling on Online Social Networks

In particular embodiments, the social-networking system 160 may forecast a metric-of-interest (e.g., a social-networking metric relating to revenue, user activity, etc.) by taking into account the effects of seasonal patterns and trends (e.g., the seasonal variances that affect sales and operations). Generally, week-over-week and year-over-year metrics show that there is some average growth value, but historical data shows that the growth is not smooth, and spikes and/or dips on certain days. In contrast, most forecast models assume relatively smooth growth, and have difficulty predicting these seasonal spikes and/or dips. Generally, seasonality refers to a repeating pattern, variation, or fluctuation in a metric-of-interest correlated with a season, day of the week (e.g., variations between weekdays and weekends, variations between Monday and Friday, etc.), period of one or more weeks or months (e.g., variations due to holidays, variations due to recurring events, variations at beginning and end of months, variations at beginning and end of quarter, variations as beginning and end of fiscal year, variations at beginning and end of calendar year, etc.), other suitable period of time, or any combination thereof. In particular embodiments, the social-networking system 160 may determine whether these seasonality effects are recurrent or can be attributed to random, unexplained daily variations in order to differentiate between indications of real growth and spikes and dips that occur merely due to seasonality effects. The metric-of-interest may be a metric that can be determined based on information from the social-networking system 160. As an example and not by way of limitation, the metric-of-interest may include metrics such as revenue (e.g., total revenue, revenue for a particular sector such as advertising, etc.), user activity (e.g., number of photo posts, video posts, tags, comments, reshares, etc.), user acquisition (e.g., number of total active users per day, number of new users per day, etc.), prices (e.g., effective cost-per-thousand impressions (eCPM) prices for online media), any other suitable metrics, and any combination thereof. The social-networking system 160 may forecast a metric-of-interest by taking into account monthly trends, effects of holidays and other significant days, and day-of-week effects and end-of-month effects (e.g., including both typical end-of-month effects in addition to end-of-quarter effects and end-of-year effects). The social-networking system 160 may analyze historical data and past seasonal variances to determine why a particular day or time period showed a particular variance. The social-networking system 160 may then generate a seasonality curve that accounts for the seasonal variances and other effects that can be combined with a general forecast curve (e.g., a forecast curve that does not account for seasonality effects) to provide an accurate forecast of future data trends for a particular metric-of-interest. Although this disclosure describes seasonality factors and metrics-of-interest in a particular manner, this disclosure contemplates seasonality factors and metrics-of-interest in any suitable manner.

Figure 3A:
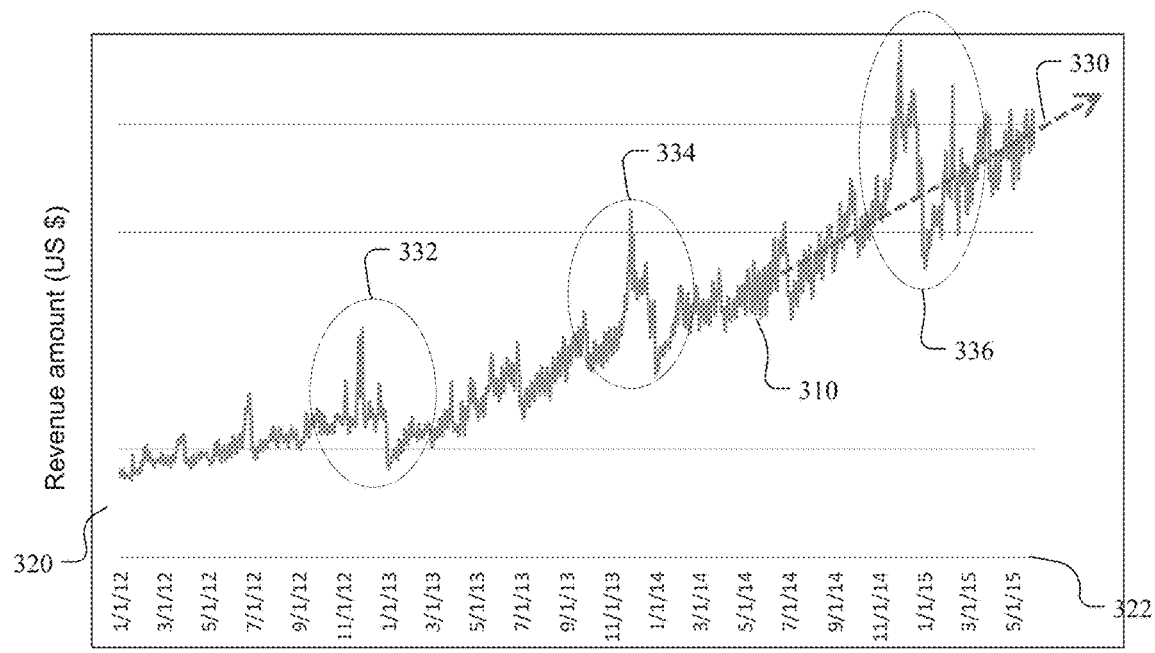
FIGS. 3A and 3B illustrate examples of revenue growth and seasonality effects over particular periods of time.
Figure 3B:
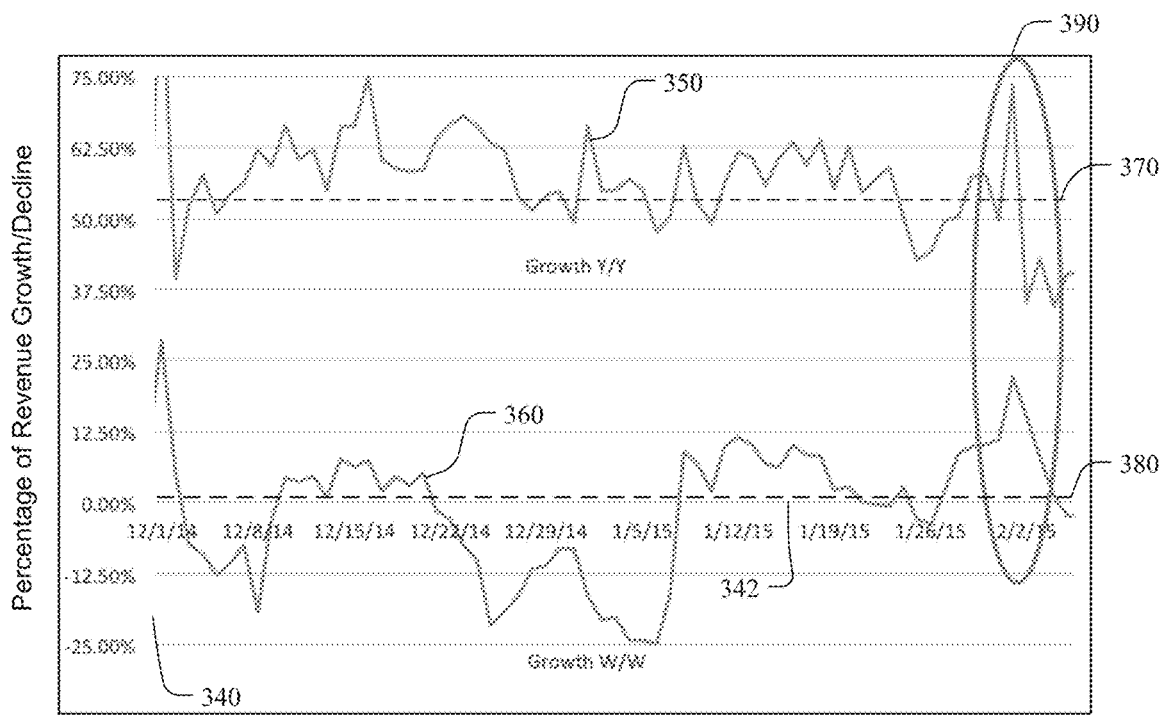
Figure 4A:
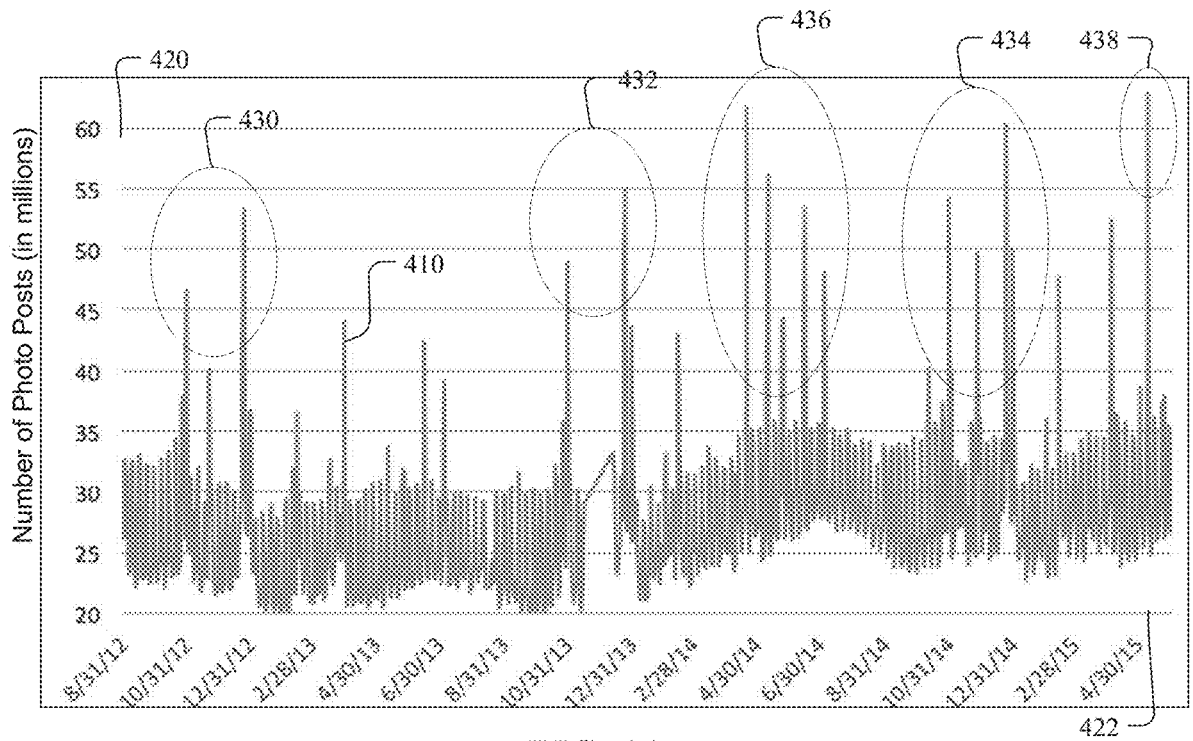
FIG. 4A illustrates the historical data on a number of photo posts occurring over a historical period.
Figure 4B:
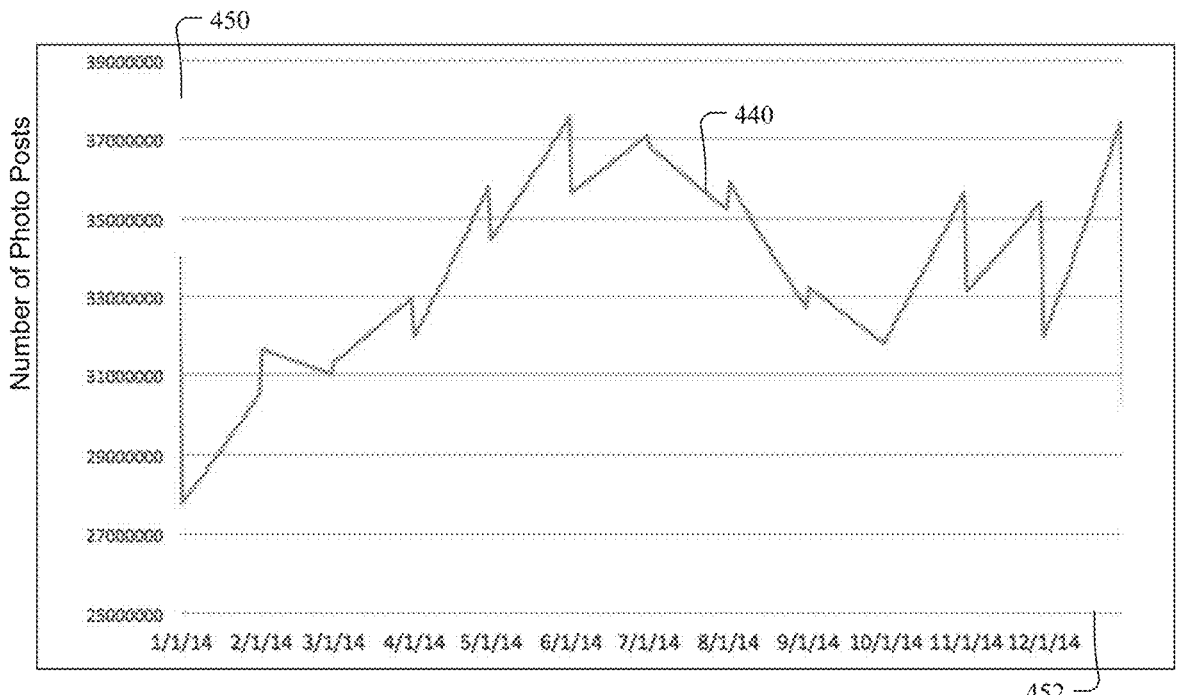
FIG. 4B illustrates an output of a forecast model showing the monthly trends for the number of photo posts over a particular period in which seasonality effects are filtered out.

FIGS. 3A and 3B illustrate examples of revenue growth and seasonality effects over particular periods of time. FIG. 3A illustrates an example of U.S. revenue growth as a plot 310 of revenue amount (in U.S. dollars), as shown on y-axis 320, over time, as shown on x-axis 322. In particular, the revenue growth is plotted over a period of time from Jan. 1, 2012 to May 1, 2015. As shown in FIG. 3A, on average, the revenue amount increased over time (e.g., as indicated by arrow 330), but exhibited potentially large time-period-to-time-period variability (e.g., as exhibited by spikes and dips, indicated by circled portions 332, 334, 336, in revenue amount on certain days or periods of time), and thus the challenge is in explaining whether these effects are recurrent or can be attributed to just random, unexplained periodic variations. FIG. 3B illustrates both an example of year-over-year revenue growth 350 and week-over-week revenue grow 360 for U.S. revenue as plots of percentage of revenue growth/decline, as shown on y-axis 340, over time, as shown on x-axis 342. In particular, the percentage of revenue growth/decline is plotted over a period of time from Dec. 1, 2014 to Feb. 2, 2015. As shown in FIG. 3B, the median year-over-year growth 370 during this period was about 57%, and the media week-over-week growth 380 during this period was about 2%. Nonetheless, both plots show large variability. As an example and not by way of limitation, on Feb. 1, 2015, the year-over-year growth was 73%, which is much higher than the median growth, while on Feb. 2, 2015, the trend reverses and year-over-year growth was a mere 35% (e.g., as indicated by circled portion 390). An explanation of this variation is that Feb. 1, 2015, was the date of the Super Bowl, and that although Feb. 2, 2015, exhibited normal growth, there was also a Super Bowl on Feb. 2, 2014, and since that day exhibited abnormally high growth, the year-to-year growth determined based on Feb. 2, 2015, and Feb. 2, 2014, thus exhibited abnormally low growth. In addition, besides the Super Bowl event, those days are also subject to day-of-week and day-of-month variations. Thus, the challenge here as well is in separating the real growth from the seasonal effects and the normal day-over-day variation. As another example and not by way of limitation, FIG. 4A illustrates a plot 410 of historical data of a number of photo posts (as shown on y-axis 420) occurring over a historical period of time (as shown on x-axis 422). In particular, the number of photo posts is plotted over a period of time from Aug. 31, 2012 to Apr. 30, 2015, and exhibited large time-period-to-time-period variability (e.g., as exhibited by spikes and dips, indicated by circled portions 430, 432, 434, 436, 438, in revenue amount on certain days or periods of time). In using the methods described above, and also described in more detail below, a seasonality model 440 as illustrated in FIG. 4B may be generated showing the monthly trends for the number of photo posts (e.g., as shown by y-axis 450) over a particular period of time (e.g., as shown by x-axis 452) in which the seasonality effects are filtered out (i.e., seasonality effects are accounted for).

In particular embodiments, the social-networking system 160 may access, from a data store of the online social network, historical data of a social-networking metric. The data store may correspond to data store 164 of social-networking system 160. The historical data may be data associated with a particular historical period of time, such a one-month period, a multi-month period, a one-year period, a multi-year period, other suitable time period, or any combination thereof. In particular embodiments, the social-networking metric may comprise one or more of user data, content data, financial data, data about other suitable metrics associated with the online social network, or any combination thereof. As an example and not by way of limitation, when the social-networking metric includes user data, the social-networking metric may include data on a number of active users of the online social network, a number of new users of the online social network, any other suitable user data, or any combination thereof. As another example and not by way of limitation, when the social-networking metric includes content data, the social-networking metric may include pages data, posts data, comments data, reshares data, other suitable content data, or any combination thereof. As yet another example and not by way of limitation, when the social-networking metric includes financial data, the social-networking metric may include revenue data, advertising data, other suitable financial data, or any combination thereof. Although this disclosure describes historical data associated with particular social-networking metrics in a particular manner, this disclosure contemplates any historical data associated with any social-networking metric in any suitable manner.

In particular embodiments, the social-networking system 160 may generate a historical-data plot for a pre-determined period of time based on the accessed historical data. The historical-data plot may be generated by plotting the social-networking metric over time within the pre-determined period of time. The pre-determined period of time may include one or more years, one or more months, one or more days, any other suitable period of time, or any combination thereof. As an example and not by way of limitation, as discussed above, FIG. 3A illustrates example revenue data occurring over a historical period of time of 3 years and 4 months (e.g., between Jan. 1, 2012 and May 1, 2015). As another example and not by way of limitation, FIG. 4A illustrates example historical data on the number of photo posts occurring over a historical period of time of 2 year 7 months (e.g., between Aug. 31, 2012 and Apr. 30, 2015). In particular embodiments, the pre-determined period of time may include a plurality of time units. As an example and not by way of limitation, the plurality of time units may include one or more days, one or more months, one or more years, any other suitable period of time, or any combination thereof. In addition, the plotting of the social-networking metric over time may include plotting, for each time unit of the pre-determined period of time, a historical-data value corresponding to the time unit associated with the historical data of the social-networking metric (e.g., as shown in FIGS. 3A and 4A). Although this disclosure describes generating a historical-data plot in a particular manner, this disclosure contemplates generating a historical-data plot in any suitable manner.

In particular embodiments, the social-networking system 160 may determine one or more events associated with fluctuations in the social-networking metric based on the historical-data plot. Each event associated with fluctuations in the social-networking metric may be associated with a sub-period of time within the pre-determined period of time. As an example and not by way of limitation, an event may be associated with a sub-period of time of a few days or a few months within a pre-determined period of time of one or more months and one or more years, respectively. In particular embodiments, the one or more events associated with the fluctuations in the social-networking metric may correspond to one or more real-world events each associated with the sub-period of time within the pre-determined period of time, as discussed below.

As an initial step in determining the one or more real-world events, a preliminary list including all holidays (e.g., U.S. holidays, international holidays, etc.) and other significant events may be created as a list of events that may potentially effect the social-networking metric. The preliminary list may be created by obtaining information from general knowledge and online sources, crowdsourcing from internal and/or external groups of people (e.g., internal and external to the online social network), other suitable sources, and any combination thereof. This preliminary list may encompass designated holidays (e.g., country-specific national holidays, region specific holidays, state-specific holidays, worldwide holidays, etc.) and other significant events (e.g., days/weeks in which events important to a social-networking metric are occurring). As an example and not by way of limitation, the preliminary list may include holidays such as Christmas, Christmas Eve, Columbus Day, Easter, Father's Day, Halloween, Independence Day, Labor Day, Martin Luther King Jr. Day, Memorial Day, Mother's Day, New Year's Day, New Year's Eve, President's Day, St. Patrick's Day, Thanksgiving, Valentine's Day, Veterans Day, and other holidays, while other significant events may include Black Friday, Cyber Monday, Daylight Savings Time begins, Daylight Savings Time ends, the Oscars, the Super Bowl, and other days associated with significant events.

Once the preliminary list of holidays and other significant events is generated, additional analysis of the list is performed in order to determine a list of relevant holidays and other significant events that affect the social-networking metric. As an example and not by way of limitation, holidays and other significant events that are most relevant (e.g., as determined based on their effect on the social-networking metric) may be determined by analyzing user demand/user activity over time because user demand and user activity tend to spike on significant holidays and days associated with other significant events. Thus, a list of relevant holidays and other significant events that affect the social-networking metric maybe generated by analyzing the historical spikes and dips in user activity metrics. In particular embodiments, the list of relevant holidays and other significant events may be determined post hoc by identifying the "peaks" of a historical-data plot showing the volume or percentage increase for a given social-networking metric. As shown in FIG. 3A, the plot 310 of revenue growth amount over time exhibits significant spikes around December of each year, and then significant dips around the beginning of January, from 2012 to 2015 (e.g., as shown by the circled portions 332, 334, 336). The significant spikes correspond to the events associated with the holiday season, including Thanksgiving, Black Friday, Cyber Monday, and Christmas, and the significant dips correspond to the period of time around New Year's Day, thus indicating that these holidays and other significant events would be added to the list of relevant holidays based on their effects on the social-networking metric of revenue. As shown in FIG. 3B, the plot 350 of revenue growth over time exhibits a significant spike at Feb. 1, 2015 (e.g., as shown by the circled portion 390), which corresponds to the Super Bowl. Accordingly, this event would also be added to the list of relevant holidays and other significant events. In addition, as shown in FIG. 4A, the plot 410 of the number of photo posts over time exhibits significant spikes during the period of time between October to January of each year from 2012 to 2015 (e.g., as shown by the circled portions 430, 432, 434), which may be attributed to holidays such as Halloween, Thanksgiving, Christmas, New Year's Eve and New Year's Day. In contrast, unlike with revenue (e.g., discussed above with regard to FIGS. 3A, and 3B), other events such as Black Friday and Cyber Monday likely did not play an important role in an increase in the number of photo posts. Furthermore, the plot 410 exhibiting significant spikes during the summertime period between May and July of 2014 and for the month of April in 2015 (e.g., as shown by the circled portions 436, 438), which may be attributed to holidays such as Mother's Day, Memorial Day, Father's Day, and Independence Day. As such, these holidays would be added to the list of relevant holidays and other significant events.

Moreover, a regression model may be used to determine the list of relevant holidays and other significant events that affect the social-networking metric by analyzing the residuals associated with each data point of the historical-data plot. In particular embodiments, the one or more events associated with the fluctuations in the social-networking metric may each correspond to the sub-period of time determined to be associated with a change in a value of the social-networking metric over the sub-period of time equal to or greater than a threshold change in the value of the social-networking metric.

Figure 5A:
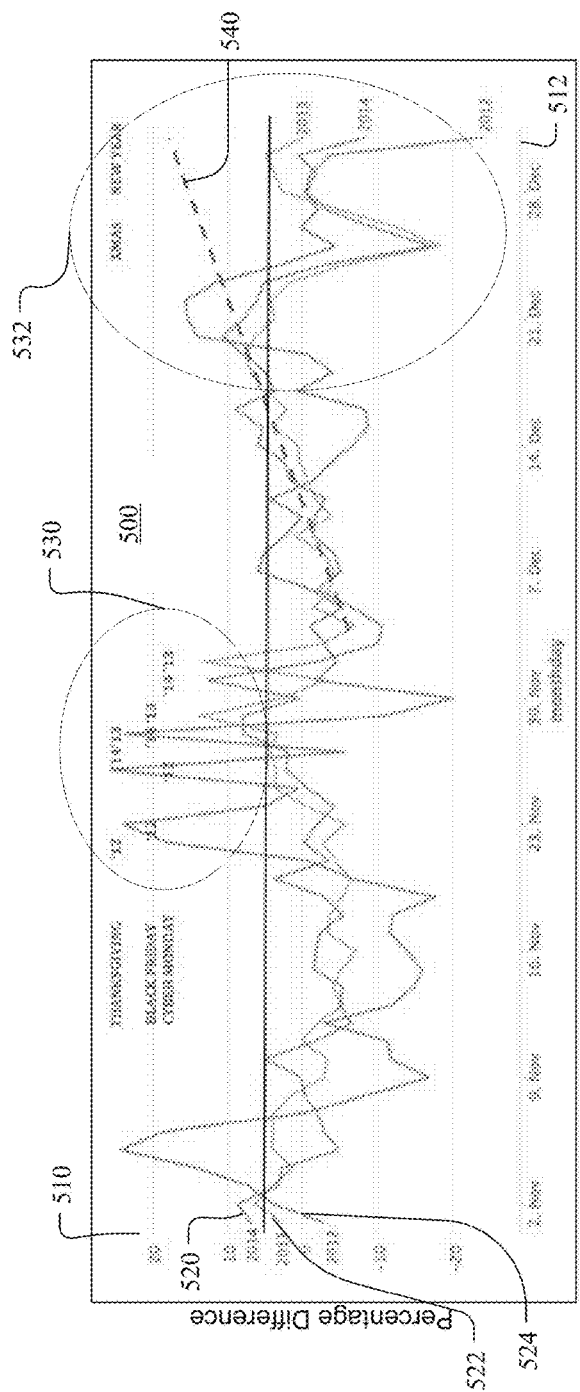
FIG. 5A illustrates a residual plot of revenue over a sample holiday season (e.g., without removing holiday effects but removing monthly trends).

As an example and not by way of limitation, FIG. 5A illustrates a residual plot 500 of revenue over a sample holiday season from November to December (e.g., without removing holiday effects but removing monthly trends). Specifically, revenue is plotted on y-axis 510 as a percentage difference (e.g., between the change in the actual value of revenue at a particular sub-period of time from a calculate regression line), and the time period is plotted on x-axis 512. Residual plot 500 includes a 2012 residual plot 520, 2013 residual plot 522, and a 2014 residual plot 524. FIG. 5A is generated based on the results of residuals calculated from a regression with month-year interactions (e.g., monthly trend effects) but without holiday effects, beginning of month effects, and end of month effects filtered out, and may be used to detect holidays and other significant events because these days are displayed as outliers due to the revenue on these days being significantly different from what one would expect on such a typical day. In addition, these days may be determined based on a calculation of the standard deviations associated with each data point, and filtering out days associated with data points that are more than a predetermined number of standard deviations away from the calculated regression line (e.g., beyond two standard deviations from the regression line). As shown in FIG. 5A, the outliers on each of the 2012 residual plot 520, 2013 residual plot 522, and 2014 residual plot 524 include a first group 530 associated with holidays such as Thanksgiving and other significant events such as Black Friday and Cyber Monday (e.g., exhibiting residuals showing a +10-20% difference between the actual revenue on these days and what one would expect on a typical day), and a second group 532 associated with holidays such as Christmas, New Year's Eve, and New Year's Day (e.g., exhibit residuals showing either around +15% or around −20% difference between the actual revenue on these days and what one would expect on a typical day). While these outliers are likely tied to real growth in revenue (e.g., due to typical increases in user activity during the holiday season), they may also be affected by seasonality effects, which can be modeled based on past-years data (as discussed below). In addition, inaccurately-illustrated trends may also be an indication of seasonality effects, such as the downward dips seen around Christmas and New Year's Day, which are different from the typical upward trend that is usually exhibited during these times (as shown by line 540).

Figure 5B:
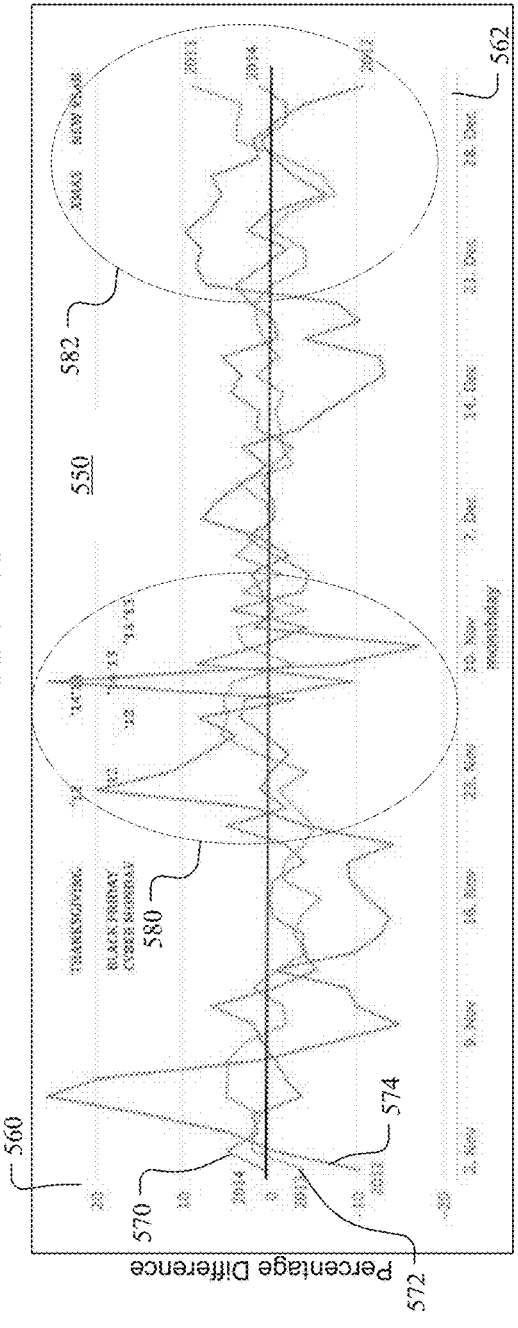
FIG. 5B illustrates a residual plot of revenue over the sample holiday season with holiday and other seasonality effects filtered out.

In contrast, FIG. 5B illustrates a residual plot 550 of revenue of the sample holiday season with the holiday and other seasonality effects filtered out (e.g., an example of a seasonality model, as described in more detail below). Specifically, revenue is plotted on y-axis 560 as a percentage difference (e.g., between the change in the actual value of revenue at a particular sub-period of time based on the residual plot 550 from a calculate regression line), and the time period is plotted on x-axis 562. Residual plot 550 includes a 2012 residual model 570, a 2013 residual model 572, and a 2014 residual model 574. As shown in FIG. 5B, which is generated based on the results of residuals calculate from a regression with seasonality effects (e.g., holiday effects), month-year interactions (e.g., monthly trend effects), beginning of month effects, and end of month effects filtered out, many of the outliers disappear, including the outliers associated with a first group 580 including Thanksgiving, Black Friday, and Cyber Monday, and a second group 582 including Christmas, New Year's Eve, and New Year's Day. In addition, the trend associated with the time period from Christmas to New Year's Day is also corrected (e.g., the residuals are properly centered such that they are likely to be above or below zero with equal probability, or in other words, such that they average approximately zero over a sufficient period of time). Note that the 2012 residual model 570 is very noisy based on certain data collection reasons, but the no recurrent biases were shown in the 2013 residual model 572 and the 2014 residual model 574 (e.g., the noise from the data in 2012 did not show up again in the data associated with 2013 and 2014). Although this disclosure describes determining a list of relevant holidays and other significant events in a particular manner, this disclosure contemplates determining a list of relevant holidays and other significant events in any suitable manner.

Methods for analyzing the residuals using regression analysis, as discussed above with regard to FIGS. 5A and 5B, are now described in detail. In particular embodiments, the social-networking system 160 may determine that the change in the value of the social-networking metric over the sub-period of time is equal to or greater than the threshold change in the value of the social-networking metric by accessing, from the data store of the online social network, a historical-forecast model of the social-networking metric for the pre-determined period of time, generating one or more regression lines for the historical-forecast model, calculating a residual value for each data point on the historical-forecast model, and determining that the calculated residual value for each data point on the historical-forecast model is beyond a threshold amount of variation. The historical-forecast model may be a model of data associated with a social-networking metric over a particular period of time that incorporates historical data of the social-networking metric, forecast data for the social-networking metric generated based at least in part on the historical data, and other relevant forecast data. The historical-forecast model may correspond to a previously-calculated future-forecast model generated for a past pre-determined period of time (e.g., past month or series of months, past year or series of years, etc.). As an example and not by way of limitation, the previously-calculated future-forecast model may correspond to a forecast model associated with a forecast of a social-networking metric that was calculated in the past for a then-future period of time, and then after that future period of time, this "future"-forecast model may be used for reference to determine the accuracy of the forecast. In other words, as an example and not by way of limitation, in 2014, a future-forecast model is created for 2015. Then 2015 passes, and then in 2016, the future-forecast model for 2015 is compared to actual data from 2015 to determine the accuracy of the forecast model. The regression lines may be generated based on regression models such as linear regressions, non-linear regressions, regularized regressions, other regression models, machine learning models, time series models, and any combination thereof. The residual value may correspond to the difference between a value on the historical-forecast model at a particular time unit and a predicted value at the particular time unit. As an example and not by way of limitation, the predicted value may be determined based on a value on the regression line corresponding to the particular time unit. The threshold amount of variation may be determined by the user or preset by social-networking system 160. As an example and not by way of limitation, the threshold amount of variation may be determined based on a threshold number of standard deviations from the regression line (e.g., two standard deviations, three standard deviations, or any other suitable number).

Alternatively, the social-networking system 160 may determine that the change in the value of the social-networking metric over the sub-period of time is equal to or greater than the threshold change in the value of the social-networking metric by generating one or more regression lines for the historical data plotted on the historical-data plot, calculating a residual value for each data point on the historical-data plot, and determining that the calculated residual value for each data point on the historical-data plot is beyond a threshold amount of variation. As discussed above, the historical-data plot may be generated for the pre-determined period of time based on the accessed historical data. As an example and not by way of limitation, when no previously-calculated future-forecast model is available, the historical data may be accessed to generate the historical-data plot. The residual value may correspond to the difference between a value of the historical data at a particular time unit and a predicted value at the particular time unit. As an example and not by way of limitation, the predicted value may be determined based on a value on the regression line corresponding to the particular time unit. As indicated above, the threshold amount of variation may be determined by the user or preset by social-networking system 160, and the threshold amount of variation may be determined based on a threshold number of standard deviations from the regression line (e.g., two standard deviations, three standard deviations, or any other suitable number). Although this disclosure describes regression analysis and the determination of residuals in a particular manner, this disclosure contemplates regression analysis and the determination of residuals in any suitable manner.

In particular embodiments, the social-networking system 160 may determine the sub-period of time associated with each of the one or more events based on a period of time in which the corresponding residual value for at least one particular time unit within the period of time is beyond the threshold amount of variation. In determining a list of relevant holidays and other significant events, this takes into account the fact that the effect of a holiday or other significant event may extend beyond the day associated with the holiday or event. As an example and not by way of limitation, based on the analysis of historical data, although the Christmas holiday is only associated with a single day of the year, the effects of Christmas typically last a few days before and after Christmas, and in fact often lasts until New Year's Day. Thus, the entirety of this time period is relevant in our determination of the seasonality effects of Christmas. In contrast, based on the analysis of historical data, the effects of holidays such as Mother's Day, Father's Day, and Independence Day, in addition to significant events such as Black Friday, Cyber Monday, and the Super Bowl, are typically only associated with the single day in which the holiday or event occurs.

In particular embodiments, once the list of relevant holidays and other significant events is generated, the social-networking system 160 may then determine a metric-effect of the one or more events on the social-networking metric. The metric-effect may include, for example, the seasonality effects of the one or more events on the social-networking metric. The metric-effect for each event may include a rate of change of the social-networking metric over the sub-period of time associated with the event and a magnitude of the change of the social-networking metric. The rate of change and the magnitude of the change of the social-networking metric may illustrate the relative impact of the holiday or event on each day during the time window affected by the holiday/event. In particular embodiments, the social-networking system 160 may determine the metric-effect of the one or more events by generating a shape-profile plot of the social-networking metric associated with the rate of change of the metric over the sub-period of time, and calculating the magnitude of change of the social-networking metric based on the percentage difference of the residual value at each particular time unit from the historical data over the sub-period of time. The shape-profile plot may be generated by plotting the historical data at each particular time unit of the sub-period of time to show the change of the social-networking metric over the sub-period of time. As discussed above, because holiday effects can last for multiple days before and after the holiday/event, the shape-profile plot determined for each holiday includes a determination of a time period affected by the holiday and the relative impact of the holiday on each day during this time period. As an example and not by way of limitation, to determine the effect of the Christmas holiday on the social-networking metric of revenue, first it may be determined that the time period of effect is between December 20 to December 30 (e.g., based on corresponding residual values being greater than a threshold amount of variation, as discussed above). Then, a shape profile for Christmas may be generated by plotting the historical data (e.g., averaged historical data over the course of multiple years) associated with each day of the days between December 20 and December 30, and then connecting the data points to obtain the shape-profile plot. As an example and not by way of limitation, sample averaged historical data associated with each day of the days between December 20 and December 30 is shown below in TABLE A.

TABLE A

| Day # | Day of Holiday/Event | Data Point |
|-------|----------------------|------------|
| Day 1 | December 20 | 30 |
| Day 2 | December 21 | 30 |
| Day 3 | December 22 | 25 |
| Day 4 | December 23 | 10 |
| Day 5 | December 24 | 5 |
| Day 6 | December 25 | 0 |
| Day 7 | December 26 | 5 |
| Day 8 | December 27 | 15 |
| Day 9 | December 28 | 15 |
| Day 10 | December 29 | 25 |
| Day 11 | December 30 | 25 |

As can be seen in this example, around Christmas, revenue initially starts off high (e.g., due to the increased amount of shopping for presents and other activity associated with the holiday), but then decreases on the day before, the day of, and the day after Christmas (e.g., due to decreased shopping and activity because people may be celebrating with family and at family gatherings), and then increases again after these couple of days (e.g., as people go back to shopping and other activities). In addition, the relative magnitude of effect on revenue during the Christmas holiday (e.g., how much the holiday contribute to the seasonality effects on the social-networking metric) may be determined based on the residual values (e.g., in percentage effect) associated with each data point (e.g., as determined based on the methods discussed above). As an example and not by way of limitation, the magnitude of effect of holidays such as Christmas (e.g., holidays associated with larger seasonal effects) may increase the metric by 10%, while the magnitude of effect of holidays such as Halloween and Independence Day (e.g., holidays associated with smaller seasonal effects) may increase the metric by only 2%. Thus, the resulting shape-profile plot for the holiday of Christmas may include information on a list of days in which the holiday effect can be expected, the shape profile of the effect based on historical data, and the magnitude of that effect. The social-networking system 160 may generate shape-profile plots and determine the magnitudes of effect for each of the holidays and events determined to be part of the list of relevant holidays and other significant events. In particular embodiments, the social-networking system 160 may generate an event database associated with the social-networking metric including a list of the one or more real-world events associated with the fluctuations in the social-networking metric, the shape-profile plot of the social-networking metric associated with each of the events, and the magnitude of change of the social-networking metric associated with each of the events. The social-networking system 160 may then store this event database in data store 164. Although this disclosure describes determining the metric-effect of the one or more events on the social-networking metric in a particular manner, this disclosure contemplates mining the metric-effect of the one or more events on the social-networking metric in any suitable manner.

In particular embodiments, the social-networking system 160 may generate a fluctuation model for the social-networking metric. The fluctuation model may include the calculated metric-effects for each of the one or more events over the pre-determined period of time. In particular embodiments, the social-networking system 160 may generate the fluctuation model for the social-networking metric by accessing the event database, and combining the shape-profile plot associated with each of the events and the magnitude of change associated with each of the events to generate the fluctuation model. This resulting fluctuation model may account for the majority of the seasonal variables (i.e., all relevant holidays and other significant days) that can affect the social-networking metric, and can be used in a variety of forecast models to accurately and realistically model the seasonality effects of relevant holidays and other significant events on the social-networking metric. In addition, in order to make this fluctuation model even more precise, the social-networking system 160 may access a day-of-week-effect model and an end-of-month-effect model for the social-networking metric from the online social network, and combine these models into a seasonality model (e.g., a seasonality curve). As discussed above, historical data has shown that there are seasonal effects associated with the day of the week due to slightly differing levels of user activity during the week, and there are also seasonal effects associated with the end of a month due to various user-activity related effects and other relevant effects (e.g., end-of-month targets/requirements, end-of-quarter targets/requirements, end of fiscal year targets/requirements, etc.). In particular embodiments, the social-networking system 160 may combine the day-of-week-effect model and the end-of-month-effect model with the fluctuation model by determining a percentage of effect associated with the fluctuation model based on the metric-effects of the one or more events, determining a percentage of effect associated with the day-of-week-effect model, and determining a percentage of effect associated with the end-of-month-effect model, and then combining, for each time unit of the pre-determined future period of time, the percentage of effect associated with the fluctuation model corresponding to the time unit, the percentage of effect associated with the day-of-week-effect model corresponding to the time unit, and the percentage of effect associated with the end-of-month-effect model corresponding to the time unit. As an example and not by way of limitation, the percentage of effect associated with the fluctuation model based on the metric-effects of the one or more events may be 30% (e.g., the effects associated with holidays and other significant events is typically relatively large and/or statistically significant), the percentage of effect associated with the day-of-week-effect model may be 2% (e.g., the effects associated with a day of the week may be small or large, and/or statistically significant depending on the social-networking metric), the percentage of effect associated with the end-of-month-effect model may be 5% (e.g., the effects associated with the end of a month is typically not too large and/or statistically significant but nonetheless may potentially have a noticeable effect). Although this disclosure describes generating a fluctuation model for the social-networking metric in a particular manner, this disclosure contemplates generating a fluctuation model for the social-networking metric in any suitable manner.

Figure 6A:
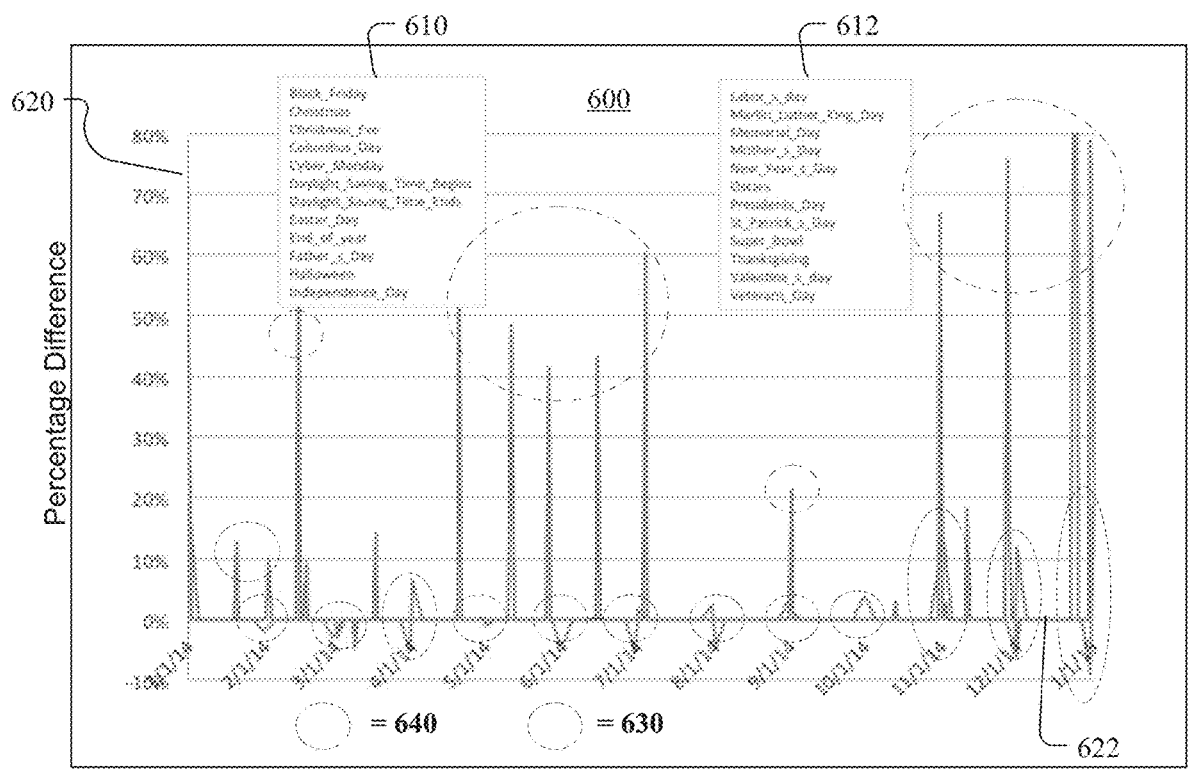
FIG. 6A illustrates a seasonality curve showing the shape profile and magnitude of seasonality effects on number of photo posts over a particular period of time.
Figure 6B:
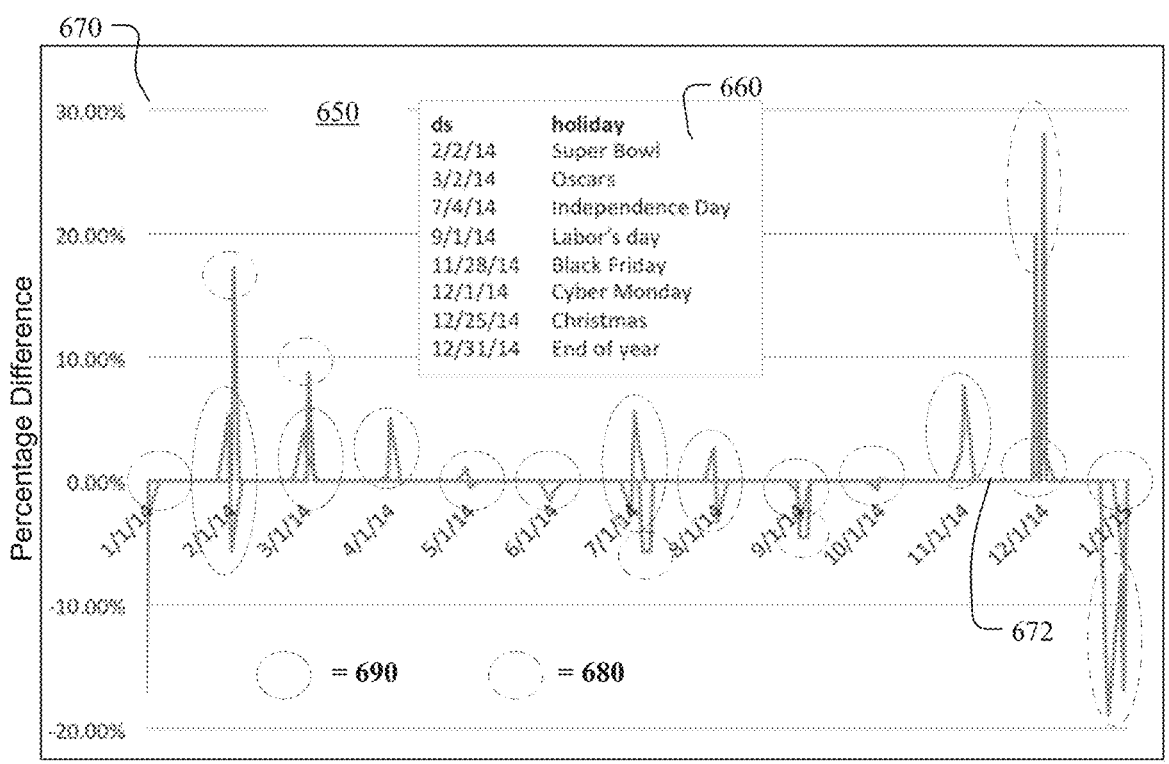
FIG. 6B illustrates a seasonality curve showing the shape profile and magnitude of seasonality effects on revenue growth over a particular period of time.

FIG. 6A illustrates a seasonality model 600 showing the shape profile and magnitude of seasonality effects on number of photo posts over a particular period of time. Lists 610 and 612 include all the holidays and other significant events that were included in generating this seasonality model. Of this list, the events of Daylight Savings Time Begins and Daylight Savings Time Ends, both of which have no seasonality effect on revenue, are used as quality control checks to confirm the accuracy of the seasonality curve. In particular, the seasonality model 600 for photos posts shows the percentage effect (e.g., the magnitude of effect) on y-axis 620 for the period of time delineated by x-axis 622. As an example and not by way of limitation, the seasonality model 600 shows peaks 630 associated with an increase in photos posts due to holidays effects and effects of other significant events (e.g., determined based on the combination of all the shape profiles for all the holidays/events), and also shows peaks and dips 640 associated with increases and decreases of photo posts due to day-of-week and end-of-month effects. FIG. 6B illustrates a seasonality model 650 showing the shape profile and magnitude of seasonality effects on revenue growth over a particular period of time. List 660 includes all the holidays and other significant events that were included in generating this seasonality model. The seasonality model 650 for revenue shows the percentage effect (e.g., the magnitude of effect) on y-axis 670 for the period of time delineated by x-axis 672. As an example and not by way of limitation, the seasonality model 650 shows peaks and dips 680 associated with increases and decreases in revenue due to holiday effects and effects of other significant events (e.g., determined based on the combination of all the shape profiles for all the holidays/events), and also shows peaks and dips 690 associated with increases and decreases in revenue due to day-of-week and end-of-month effects. As shown in FIGS. 6A and 6B, the percentage of effect associated with both the day-of-week effect and the end-of-month effect are typically much less than the percentage of effect associated with the fluctuation model. Although this disclosure describes generating a seasonality model in a particular manner, this disclosure contemplates generating a seasonality model in any suitable manner.

The generated fluctuation model and/or seasonality model may then be used to generate a future-forecast model (e.g., a forecast model used to forecast a social-networking metric over a future period of time while filtering out seasonality effects of holidays and other significant events, day-of-week effects, and end-of-month effects) by combining the fluctuation model or seasonality model with a forecast data-plot (e.g., a forecast plot of data points for the social-networking metric generated based on analysis of historical data). In particular embodiments, the social-networking system 160 may access, from the data store of the online social network, forecast data of the social-networking metric. The forecast data may be associated with a pre-determined future period of time. As an example and not by way of limitation, the pre-determined future period of time may be a future month, a future year, or suitable period of time, and any combination thereof. The social-networking system 160 may then generate a forecast-data plot of the social-networking metric for the pre-determined future period of time based on the accessed forecast data.

In particular embodiments, the social-networking system 160 may modify the forecast-data plot by combining the fluctuation model with the forecast-data plot. Then, the social-networking system 160 may access a day-of-week-effect model and an end-of-month-effect model for the social-networking metric from the online social network, and further modify the forecast-data plot by combining the day-of-week-effect model and the end-of-month-effect model with the fluctuation model and the forecast-data plot. In particular embodiments, the social-networking system 160 may combine the day-of-week-effect model and the end-of-month-effect model with the fluctuation model and the forecast-data plot by determining a percentage of effect associated with the fluctuation model based on the metric-effects of the one or more events, determining a percentage of effect associated with the day-of-week-effect model, and determining a percentage of effect associated with the end-of-month-effect model, and then combining, for each time unit of the pre-determined future period of time, a value associated with the forecast-data plot with the percentage of effect associated with the fluctuation model corresponding to the time unit, the percentage of effect associated with the day-of-week-effect model corresponding to the time unit, and the percentage of effect associated with the end-of-month-effect model corresponding to the time unit. Alternatively, the social-networking system 160 may simply modify the forecast-data plot by combining the seasonality model with the forecast-data plot since the seasonality model already takes into account the relative effects of the fluctuation model, the day-of-week-effect model, and the end-of-month-effect model. Although this disclosure describes generating a future-forecast model in a particular manner, this disclosure contemplates generating a future-forecast model in any suitable manner.

Figure 7A:
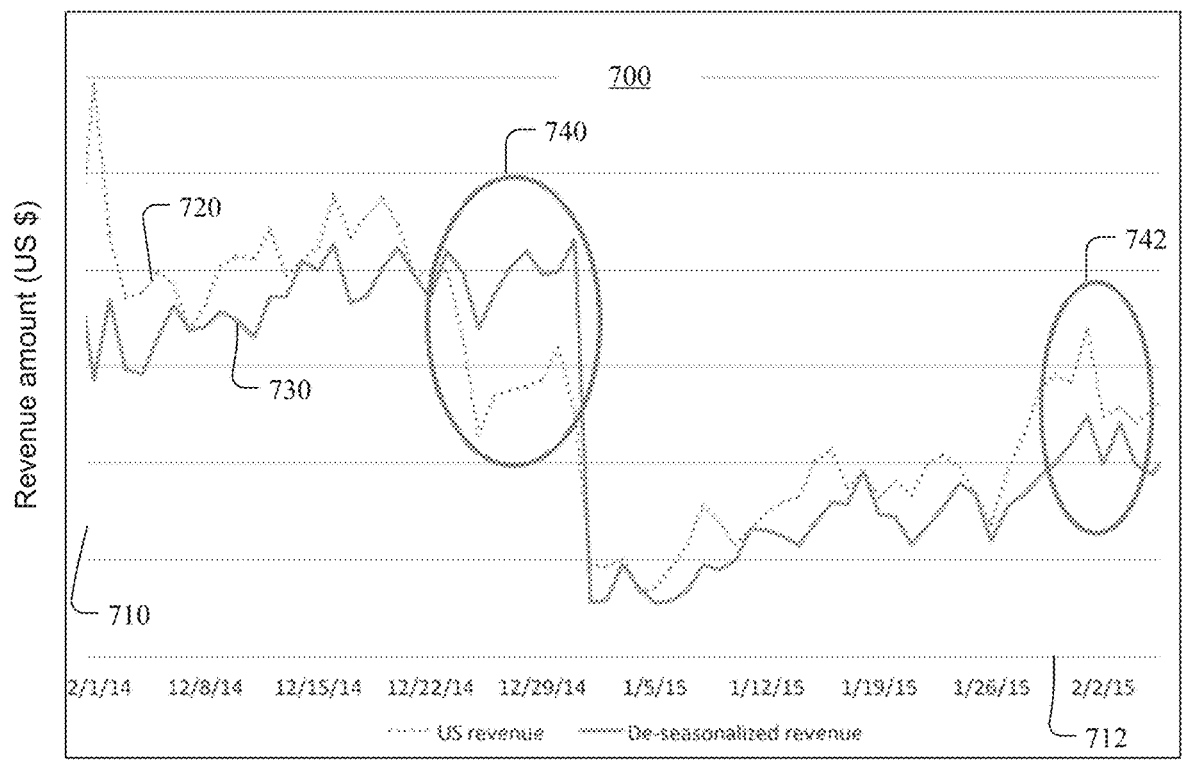
FIG. 7A illustrates an example of a revenue curve with seasonal effects and a revenue curve without seasonal effects.
Figure 7B:
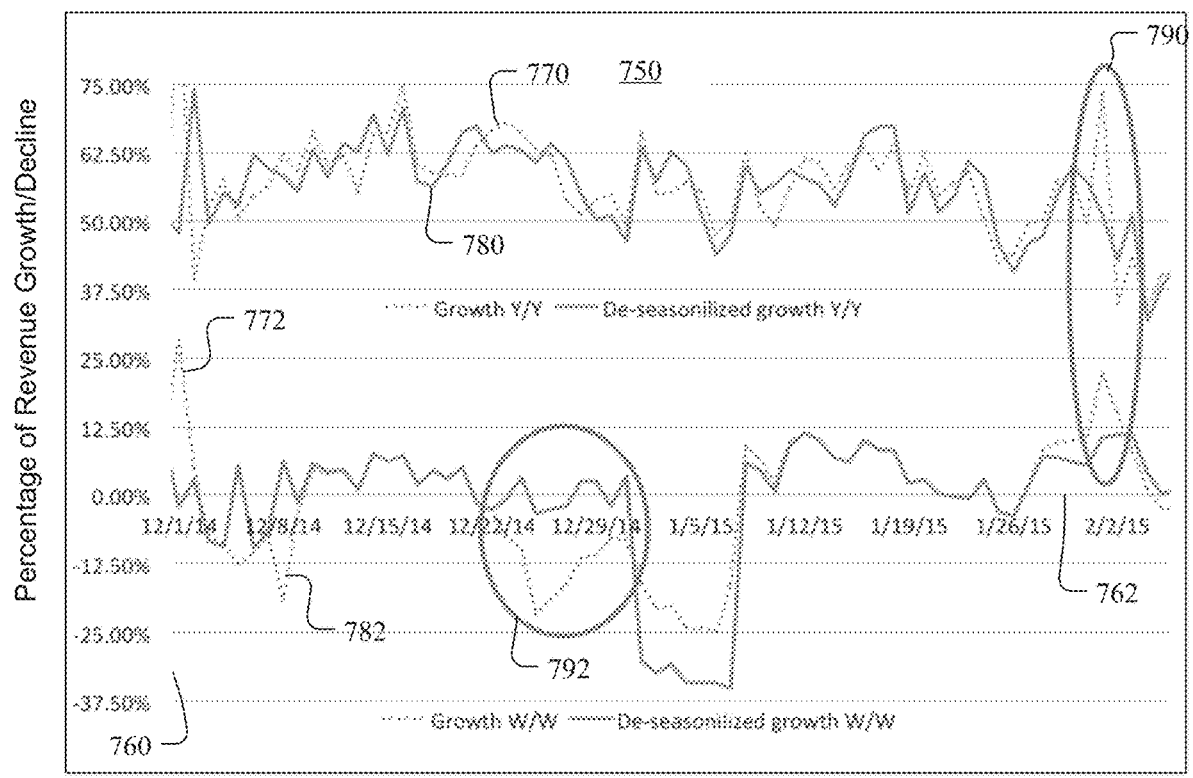
FIG. 7B illustrates an example of year-over-year revenue growth with and without seasonal effects, and an example of week-over-week revenue growth with and without seasonal effects.

In particular embodiments, historical data for a social-networking metric may be compared with a seasonality model to check the accuracy of the seasonality model as an accurate representation of the effects of holidays and other significant events, in addition to day-of-week and end-of-month effects, on a social-networking metric. FIG. 7A illustrates an example 700 of a revenue curve with seasonal effects and a revenue curve without seasonal effects (i.e., with seasonal effects filtered out). As shown in FIG. 7A, the revenue growth is plotted by revenue amount on y-axis 710 over a period of time from Feb. 1, 2014 to Feb. 2, 2015, plotted on x-axis 712. Specifically, a historical data plot 720 of U.S. revenue growth over this time period is plotted to show the historical trends throughout the year, which may show inaccurate trends based on large variability in the data. In contrast, a seasonality model 730 of U.S. revenue growth over this time period are plotted taking into account the seasonality effects (e.g., associated with holidays and other significant days, the day of the week, and the end of the month) by filtering out these effects so that the seasonality model 730 more accurately represents the trends that are occurring in the data. As an example and not by way of limitation, the very high values for the Super Bowl (on Feb. 2, 2015) and the very low values associated with Christmas (on Dec. 25, 2014) and New Year's Day (on Jan. 1, 2015) in the historical data plot 720 regress to the mean value (e.g., associated with a regression line) in the seasonality model 730 after the curve is "deseasonalized," as indicated by circled portions 740 and 742, respectively. In addition, FIG. 7B illustrates an example 750 of year-over-year revenue growth with and without seasonal effects, and an example of week-over-week revenue growth with and without seasonal effects. As shown in FIG. 7B, the revenue growth is plotted by percentage of revenue growth/decline on y-axis 760 over a period of time from Dec. 1, 2014 to Feb. 2, 2015, plotted on the x-axis 762. Specifically, a plot of year-over-year historical percentage of growth/decline 770, in addition to a plot of week-over-week historical percentage of growth/decline 772, are plotted over this time period to show the historical trends through these months. Similar to the example above, these plots may show inaccurate trends based on large variability in the data (e.g., due to the effects of holidays and other significant days, the day of the week, and the end of the month). In contrast, a year-over-year revenue-growth seasonality model 780, in addition to a week-over-week revenue-growth seasonality model 782, are plotted taking into account seasonality effects by filtering out these effects so that the year-over-year revenue-growth seasonality model 780 and week-over-week revenue-growth seasonality model 782 more accurately represents the trends that are occurring in the data. As an example and not by way of limitation, the large variability observed during Christmas and New Year's Day (as indicated by circled portion 790), in addition to the large variability observed during the Super Bowl (as indicated by circled portion 792), regress to the mean value (e.g., associated with a regression line) after the curves are "deseasonalized." Moreover, as discussed above, FIG. 4B illustrates another example of a seasonality model 440 that is capable of more accurately showing the month trends associated with a number of photo posts, and FIG. 5B illustrates yet another example of a seasonality plot 550 that is capable of more accurately showing the increases and decreases in revenue (as a residual of the data) over the holiday time period (e.g., by showing that the majority of the large variability regressed to the mean value after "deseasonalizing" the data). Although this disclosure describes seasonality models in a particular manner, this disclosure contemplates seasonality models in any suitable manner.

In particular embodiments, the social-networking system 160 may access a social graph of the online social network including a plurality of nodes and a plurality of edges connecting the nodes (as discussed below). Each of the edges between two of the nodes may represent a single degree of separation between them. In addition, the nodes may include a plurality of user nodes corresponding to a plurality of users of the online social network, respectively, and a plurality of concept nodes corresponding to a plurality of concepts associated with the online social network. In particular embodiments, each of the one or more events (e.g., holidays and other significant events) associated with fluctuations in the social-networking metric may be associated with a concept node of the social graph. Although this disclosure describes events corresponding to concept nodes of a social graph in a particular manner, this disclosure contemplates the events corresponding to nodes of the social graph in any suitable manner.

Figure 8:
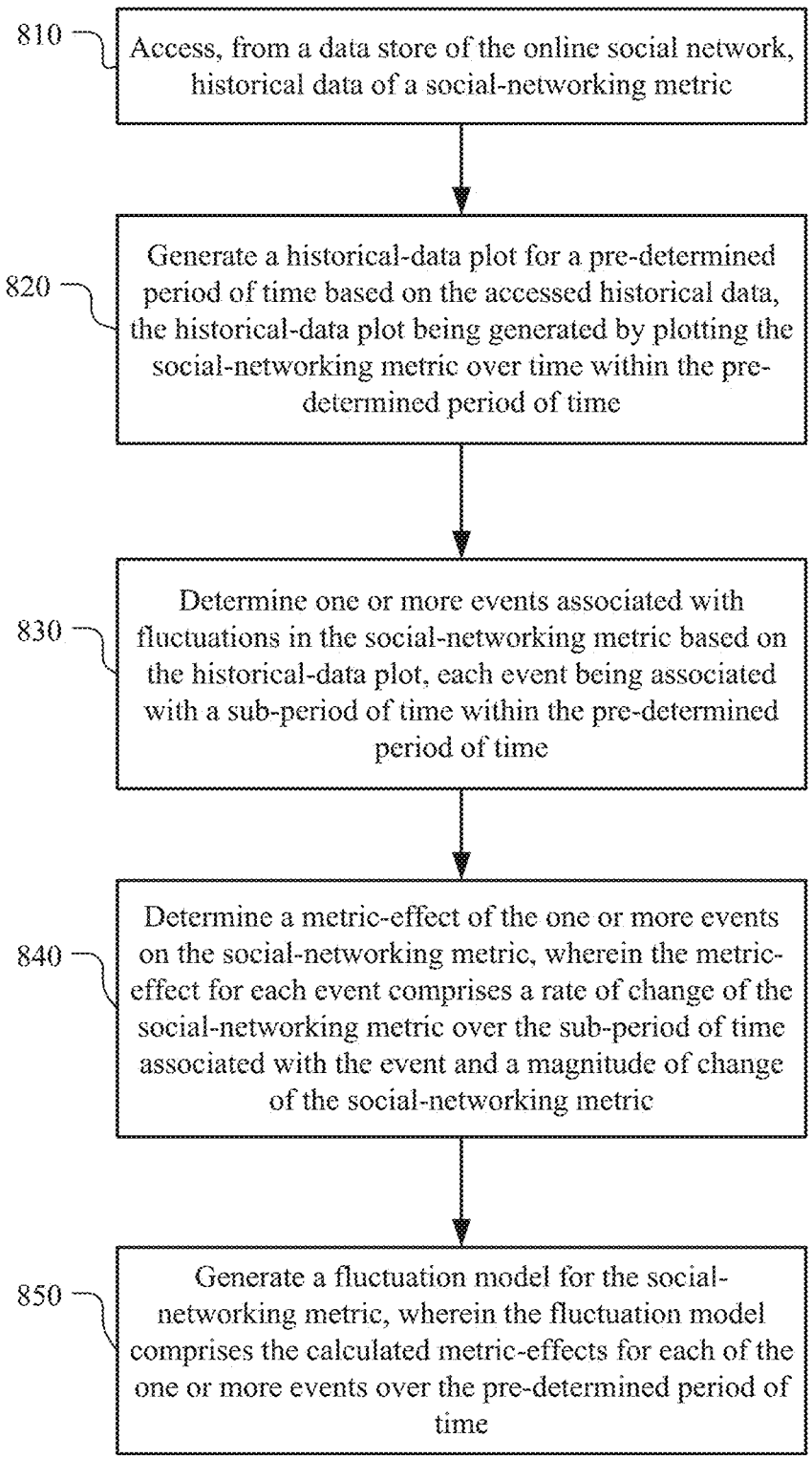
FIG. 8 shows an example method for forecasting a social-networking metric.

FIG. 8 illustrates an example method 800 for forecasting a social-networking metric. The method may begin at step 810, where the social-networking system 160 may access, from a data store of an online social network, historical data of a social-networking metric. At step 820, the social-networking system 160 may generate a historical-data plot for a pre-determined period of time based on the accessed historical data. The historical-data plot may be generated by plotting the social-networking metric over time within the pre-determined period of time. At step 830, the social-networking system 160 may determine one or more events associated with fluctuations in the social-networking metric based on the historical-data plot. Each event may be associated with a sub-period of time within the pre-determined period of time. At step 840, the social-networking system 160 may determine a metric-effect of the one or more events on the social-networking metric. The metric-effect for each event may include a rate of change of the social-networking metric over the sub-period of time associated with the event and a magnitude of change of the social-networking metric. At step 850, the social-networking system 160 may generate a fluctuation model for the social-networking metric. The fluctuation model may include the calculated metric-effects for each of the one or more events over the pre-determined period of time. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for forecasting a social-networking metric including the particular steps of the method of FIG. 8, this disclosure contemplates any suitable method for forecasting a social-networking metric including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Systems and Methods

Figure 9:
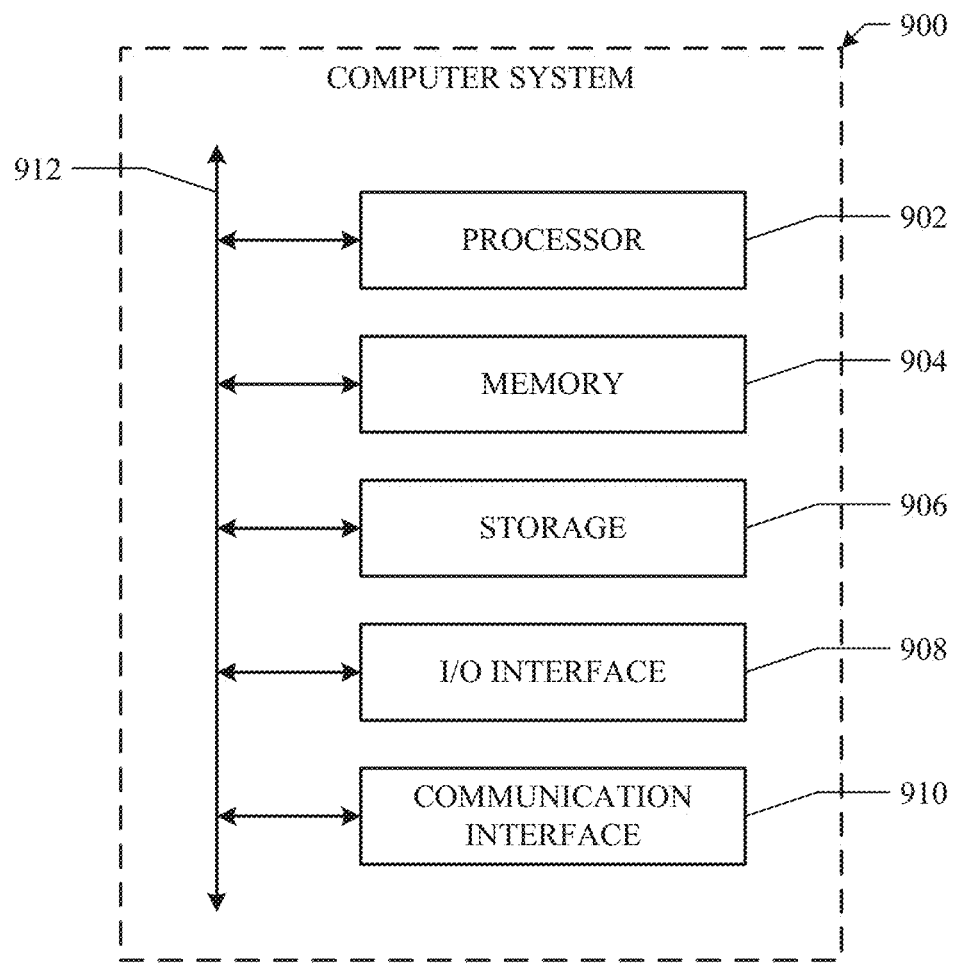
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices of an online social network:

accessing, by the one or more computing devices, a social graph of the online social network comprising a plurality of nodes and a plurality of edges connecting the nodes, each of the edges between two of the nodes representing a single degree of separation between them, the nodes comprising:

a plurality of user nodes corresponding to a plurality of users of the online social network, respectively; and a plurality of concept nodes corresponding to a plurality of concepts associated with the online social network:

accessing, from a data store of the online social network, historical data of a social-networking metric associated with the plurality of user nodes;

generating, by the one or more computing devices, a historical-data plot for a pre-determined period of time based on the accessed historical data, the historical-data plot being generated by plotting the social-networking metric over time within the pre-determined period of time;

determining, by the one or more computing devices, one or more events associated with fluctuations in the social-networking metric based on the historical-data plot, each event being associated with a sub-period of time within the pre-determined period of time, wherein the one or more events associated with fluctuations in the social-networking metric are associated with one or more respective concept nodes of the plurality of concept notes;

determining, by the one or more computing devices, a metric-effect of the one or more events on the social-networking metric, wherein the metric-effect for each event comprises a rate of change of the social-networking metric over the sub-period of time associated with the event and a magnitude of change of the social-networking metric;

generating, by the one or more computing devices, a fluctuation model for the social-networking metric, wherein the fluctuation model comprises the calculated metric-effects for each of the one or more events over the pre-determined period of time;

accessing, by the one or more computing devices, forecast data of the social-networking metric associated with a pre-determined future period, wherein the forecast data is generated based on the historical data;

predicting, by the one or more computing devices, future trends of the social-networking metric based on a combination of the fluctuation model and the forecast data of the social-networking metric associated with the pre-determined future period;

generating, by the one or more computing devices, a forecast-data plot of the social-networking metric based on the predicted future trends of the social networking metric for the pre-determined future period of time to be sent to a client device; and sending, by the one or more computing devices, in response to generating the forecast-data plot, instruction data representative of an instruction to display the forecast-data plot to the client device.

2. The method of claim 1, wherein the social-networking metric comprises one or more of:
   user data, which comprises one or more of: a number of active users of the online social network, or a number of new users of the online social network;
   content data, which comprises one or more of: pages data, posts data, comments data, or reshares data; or
   financial data, which comprises one or more of: revenue data, or advertising data.

3. The method of claim 1, wherein the pre-determined period of time comprises one or more years.

4. The method of claim 1, wherein the pre-determined period of time comprises a plurality of time units; and wherein the plotting the social-networking metric over time comprises plotting, for each time unit of the pre-determined period of time, a historical-data value corresponding to the time unit associated with the historical data of the social-networking metric.

5. The method of claim 1, wherein the one or more events associated with the fluctuations in the social-networking metric correspond to one or more real-world events each associated with the sub-period of time within the pre-determined period of time.

6. The method of claim 1, wherein the one or more events associated with the fluctuations in the social-networking metric each correspond to the sub-period of time determined to be associated with a change in a value of the social-networking metric over the sub-period of time equal to or greater than a threshold change in the value of the social-networking metric.

7. The method of claim 6, wherein determining that the change in the value of the social-networking metric over the sub-period of time is equal to or greater than the threshold change in the value of the social-networking metric comprises:
   accessing, from the data store of the online social network, a historical-forecast model of the social-networking metric for the pre-determined period of time;
   generating one or more regression lines for the historical-forecast model;
   calculating a residual value for each data point on the historical-forecast model, the residual value being the difference between a value on the historical-forecast model at a particular time unit and a predicted value at the particular time unit, the predicted value determined based on a value on the regression line corresponding to the particular time unit; and
   determining that the calculated residual value for each data point on the historical-forecast model is beyond a threshold amount of variation.

8. The method of claim 7, wherein the historical-forecast model corresponds to a previously-calculated future-forecast model generated for a past pre-determined period of time.

9. The method of claim 6, wherein determining that the change in the value of the social-networking metric over the sub-period of time is equal to or greater than the threshold change in the value of the social-networking metric comprises:
   generating one or more regression lines for the historical data plotted on the historical-data plot;
   calculating a residual value for each data point on the historical-data plot, the residual value being the difference between a value of the historical data at a particular time unit and a predicted value at the particular time unit, the predicted value determined based on a value on the regression line corresponding to the particular time unit;
   determining that the calculated residual value for each data point on the historical-data plot is beyond a threshold amount of variation.

10. The method of claim 9, wherein the sub-period of time associated with each of the one or more events is determined based on a period of time in which the corresponding residual value for at least one particular time unit within the period of time is beyond the threshold amount of variation.

11. The method of claim 10, wherein determining of the metric-effect of the one or more events comprises:
   generating a shape-profile plot of the social-networking metric associated with the rate of change of the metric over the sub-period of time, the shape-profile plot being generated by plotting the historical data at each particular time unit of the sub-period of time; and
   calculating the magnitude of change of the social-networking metric based on the percentage difference of the residual value at each particular time unit from the historical data over the sub-period of time.

12. The method of claim 11, further comprising generating an event database associated with the social-networking metric comprising:
a list of the one or more real-world events associated with the fluctuations in the social-networking metric;
the shape-profile plot of the social-networking metric associated with each of the events; and
the magnitude of change of the social-networking metric associated with each of the events.

13. The method of claim 12, wherein generating the fluctuation model for the social-networking metric comprises:
accessing the event database; and
combining the shape-profile plot associated with each of the events and the magnitude of change associated with each of the events to generate the fluctuation model.

14. The method of claim 1, further comprising:
accessing, from the data store of the online social network, the forecast data of the social-networking metric;
generating a forecast-data plot of the social-networking metric for the pre-determined future period of time based on the accessed forecast data; and
modifying the forecast-data plot by combining the fluctuation model with the forecast-data plot.

15. The method of claim 14, further comprising:
accessing a day-of-week-effect model and an end-of-month-effect model for the social-networking metric from the online social network; and
further modifying the forecast-data plot by combining the day-of-week-effect model and the end-of-month-effect model with the fluctuation model and the forecast-data plot.

16. The method of claim 15, wherein the combining the day-of-week-effect model and the end-of-month-effect model with the fluctuation model and the forecast-data plot comprises:
determining a percentage of effect associated with the fluctuation model based on the metric-effects of the one or more events;
determining a percentage of effect associated with the day-of-week-effect model;
determining a percentage of effect associated with the end-of-month-effect model; and
combining, for each time unit of the pre-determined future period of time, a value associated with the forecast-data plot with the percentage of effect associated with the fluctuation model corresponding to the time unit, the percentage of effect associated with the day-of-week-effect model corresponding to the time unit, and the percentage of effect associated with the end-of-month-effect model corresponding to the time unit.

17. The method of claim 1, further comprising:
accessing a social graph of the online social network comprising a plurality of nodes and a plurality of edges connecting the nodes, each of the edges between two of the nodes representing a single degree of separation between them, the nodes comprising:
a plurality of user nodes corresponding to a plurality of users of the online social network, respectively; and
a plurality of concept nodes corresponding to a plurality of concepts associated with the online social network.

18. The method of claim 17, wherein each of the one or more events associated with fluctuations in the social-networking metric is associated with a concept node of the social graph.

19. One or more computer-readable non-transitory storage media embodying software that is operable when executed to:
access, by one or more computing devices, a social graph of the online social network comprising a plurality of nodes and a plurality of edges connecting the nodes, each of the edges between two of the nodes representing a single degree of separation between them, the nodes comprising:
a plurality of user nodes corresponding to a plurality of users of the online social network, respectively; and
a plurality of concept nodes corresponding to a plurality of concepts associated with the online social network;
access, from a data store of an online social network, historical data of a social-networking metric associated with the plurality of user nodes;
generate, by the one or more computing devices, a historical-data plot for a pre-determined period of time based on the accessed historical data, the historical-data plot being generated by plotting the social-networking metric over time within the pre-determined period of time;
determine, by the one or more computing devices, one or more events associated with fluctuations in the social-networking metric based on the historical-data plot, each event being associated with a sub-period of time within the pre-determined period of time, wherein the one or more events associated with fluctuations in the social-networking metric are associated with one or more respective concept nodes of the plurality of concept nodes;
determine, by the one or more computing devices, a metric-effect of the one or more events on the social-networking metric, wherein the metric-effect for each event comprises a rate of change of the social-networking metric over the sub-period of time associated with the event and a magnitude of change of the social-networking metric;
generate, by the one or more computing devices, a fluctuation model for the social-networking metric, wherein the fluctuation model comprises the calculated metric-effects for each of the one or more events over the predetermined period of time;
access, by the one or more computing devices, forecast data of the social-networking metric associated with a pre-determined future period, wherein the forecast data is generated based on the historical data; and
predict, by the one or more computing devices, future trends of the social-networking metric based on a combination of the fluctuation model and the forecast data of the social-networking metric associated with the pre-determined future period;
generate, by the one or more computing devices, a forecast-data plot of the social-networking metric based on the predicted future trends of the social networking metric for the pre-determined future period of time to be sent to a client device;
send, by the one or more computing devices in response to generating the forecast-data plot, instruction data representative of an instruction to display the forecast-data plot to the client device.

20. A system comprising: one or more processors; and a non-transitory memory coupled to the processors comprising instructions executable by the processors, the processors operable when executing the instructions to:
- access, by one or more computing devices, a social graph of the online social network comprising a plurality of nodes and a plurality of edges connecting the nodes, each of the edges between two of the nodes representing a single degree of separation between them, the nodes comprising:
  - a plurality of user nodes corresponding to a plurality of users of the online social network, respectively; and
  - a plurality of concept nodes corresponding to a plurality of concepts associated with the online social network;
- access, from a data store of an online social network, historical data of a social-networking metric associated with the plurality of user nodes;
- generate, by the one or more computing devices, a historical-data plot for a pre-determined period of time based on the accessed historical data, the historical-data plot being generated by plotting the social-networking metric over time within the pre-determined period of time;
- determine, by the one or more computing devices, one or more events associated with fluctuations in the social-networking metric based on the historical-data plot, each event being associated with a sub-period of time within the pre-determined period of time, wherein the one or more events associated with fluctuations in the social-networking metric are associated with one or more respective concept nodes of the plurality of concept nodes;
- determine, by the one or more computing devices, a metric-effect of the one or more events on the social-networking metric, wherein the metric-effect for each event comprises a rate of change of the social-networking metric over the sub-period of time associated with the event and a magnitude of change of the social-networking metric;
- generate, by the one or more computing devices, a fluctuation model for the social-networking metric, wherein the fluctuation model comprises the calculated metric-effects for each of the one or more events over the predetermined period of time;
- access, by the one or more computing devices, forecast data of the social-networking metric associated with a pre-determined future period, wherein the forecast data is generated based on the historical data; and
- predict, by the one or more computing devices, future trends of the social-networking metric based on a combination of the fluctuation model and the forecast data of the social-networking metric associated with the pre-determined future period;
- generate, by the one or more computing devices, a forecast-data plot of the social-networking metric based on the predicted future trends of the social networking metric for the pre-determined future period of time to be sent to a client device;
- send, by the one or more computing devices in response to generating the forecast-data plot, instruction data representative of an instruction to display the forecast-data plot to the client device.

21. The method of claim 1, wherein predicting the future trends of the social-networking metric comprises filtering out seasonality effects of the determined one or more events on the future trends based on the fluctuation model.

* * * * *